FREQUENCY MODULATION RECEIVER

Filed Nov. 12, 1947

INVENTOR.
JOSEPH C. TELLIER
BY
Brown, Denk & Synnestvedt
AGENTS

Patented Aug. 29, 1950

2,520,480

UNITED STATES PATENT OFFICE 2,520,480

FREQUENCY MODULATION RECEIVER

Joseph C. Tellier, Penn Wynne, Pa., assignor to Philco Corporation, Philadelphia, Pa., a corporation of Pennsylvania Application November 12, 1947, Serial No. 785,220

9 Claims. (Cl. 250—20)

Figure 1:
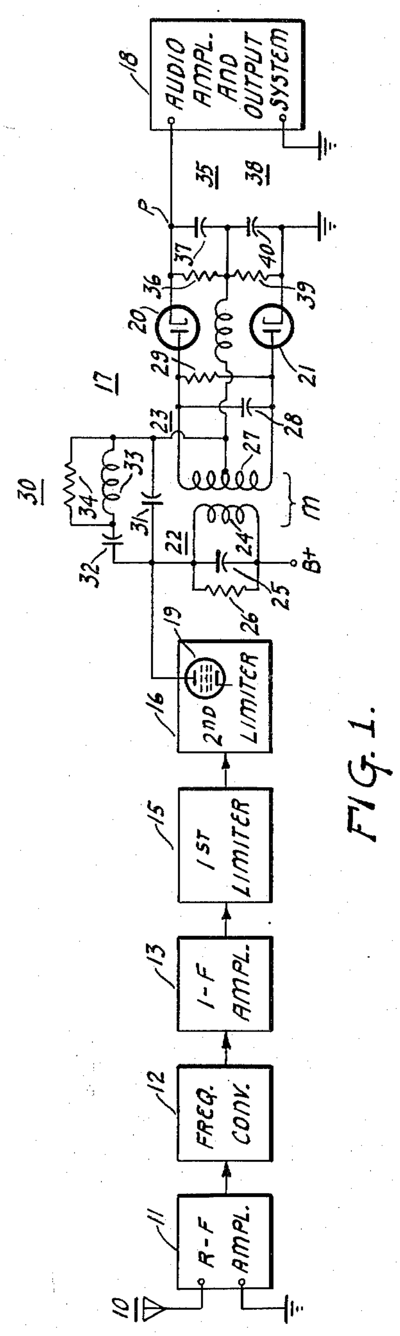

The invention herein described and claimed relates to an improvement in the limiter-discriminator system of a frequency-modulation (FM) receiver. More particularly, the invention provides means for improving the noise-rejection characteristics of the limiter-discriminator system, thereby improving the quality of the audio output of the receiver.

The invention resides primarily in the discovery of an important cause of noise in FM receivers and secondarily in the provision of relatively simple means for remedying the situation.

In FM receivers, it is of course desirable that the signal wave being detected be of substantially constant amplitude. However, a certain amount of amplitude variation is virtually unavoidable, being most frequently caused by random noise signals or other transient disturbances.

It is admitted, of course, that FM receivers of the present art are partially unresponsive to unwanted amplitude variations; however, they are not completely insensitive to amplitude variations, particularly to strong noise impulses. The limiter which precedes the discriminator removes most of the amplitude variations by substantially suppressing all signal peaks which exceed a selected magnitude. But the output-versus-input characteristic of present limiter circuits is not absolutely flat and consequently the limiter allows a residue of the amplitude variations to reach the discriminator. Moreover, while the discriminator is commonly said to be, and is in considerable measure, insensitive to amplitude variations, it may be stated conversely that the discriminator is responsive in a small measure to applied amplitude variations. And though the response of the discriminator to amplitude variations is relatively small, the response is frequently large enough to be troublesome and disturbing.

I have discovered that an appreciable amount of noise appearing in the audio output of prior art FM receivers is related to the presence, in the output of the limiter, of frequencies which are harmonically related to frequencies lying within the I.-F. pass band of the receiver. Moreover, I have ascertained that the second harmonic is a particularly objectionable source of noise. I have found that, by attenuating substantially the second harmonic, substantial improvement is obtained in the noise-rejection characteristic of the limiter-discriminator system and of the receiver. By the noise-rejection characteristic is meant the ability of the system to reject noise. This ability is customarily expressed by an FM-AM ratio, which may be defined as the ratio of the voltage output of the discriminator at full, or other stated, frequency-deviation to the voltage output of the discriminator with 30 per cent, or other stated, amplitude modulation.

It is an object of this invention to provide, in an FM receiver, a limiter-discriminator system having improved noise-rejection characteristics as evidenced by a substantially improved FM-AM ratio.

It is a feature of this invention that means are provided for substantially attenuating wave compounds which are harmonically related to the intermediate frequency of the receiver, particularly the second harmonic. The means provided for attenuating the second, or other objectionable, harmonic are simple, the merit in the invention residing primarily, as previously indicated, in the discovery that it is advantageous to suppress the second and/or other objectionable harmonic. Ordinarily, it will be sufficient to suppress the second harmonic only.

Figure 2:
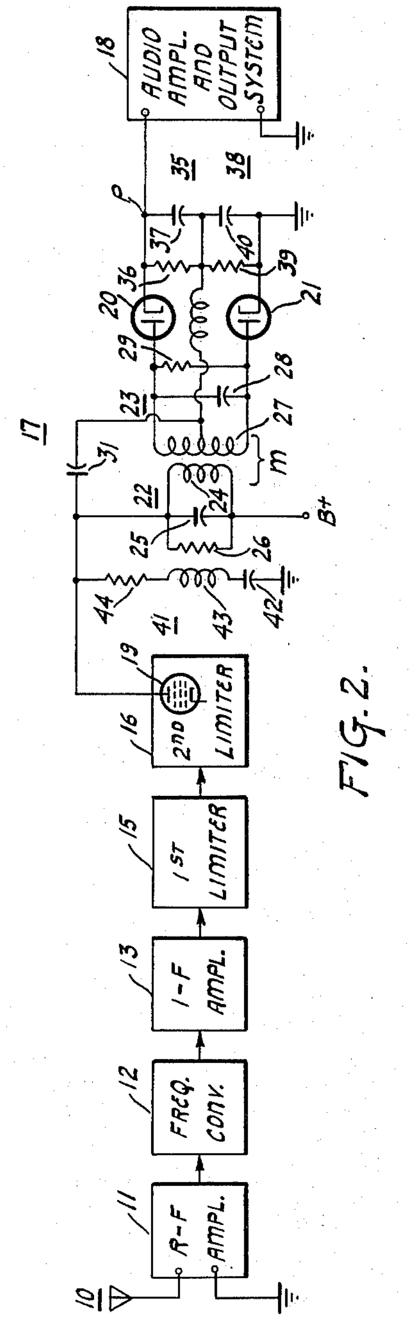

These and other objects, features and advantages of the present invention will be best understood by a consideration of the following detailed description and of the accompanying drawings, wherein:

Figure 1 is a representation, partly schematic, partly diagrammatic, of an FM radio receiver which includes one embodiment of the present invention; and Figure 2 illustrates an FM receiver circuit which includes an alternate form of the present invention.

Referring now to Figure 1, there is shown an FM radio receiver comprising an antenna 10, an R.-F. amplifier 11, a first detector-oscillator or frequency converter 12, an I.-F. amplifier 13, a limiter-discriminator system comprising first and second limiter stages 15 and 16 and a frequency discriminator 17, and an audio amplifier and output system 18. The limiter-discriminator system is of conventional form, except, of course, for the modification introduced by the present invention, to be described in detail hereinafter.

Pentode 19 of the second limiter stage 16 is coupled to diodes 20, 21 of discriminator 17 by means which include a tuned primary circuit 22 and a tuned secondary circuit 23 mutually coupled as indicated by the designation M. Primary circuit 30 comprises primary winding 24, capacitor 25, and resistor 26. Secondary circuit 23 comprises secondary winding 27, capacitor 28, and resistor 29. Both the primary circuit 22 and the secondary tuned circuit 23 are tuned to the undeviated frequency of the I.-F. carrier wave, i. e., to the center frequency of the I.-F. pass band And in Figure 1, both of the primary and secondary tuned circuits are shown to be damped, as by resistors 26 and 29, respectively, in order to lower the Q factors and provide wide-band response, a wide-band circuit being illustrated since the improvement provided by the present invention is ordinarily greater in wide-band receivers, as will become clear as the description proceeds.

In conventional discriminators of the type shown in Figure 1, commonly referred to as Seeley, or Foster-Seeley, discriminators, the high potential end of the primary winding is coupled, by way of a coupling capacitor, to the mid-point of the secondary winding. However, in accordance with the present invention, and for reasons and purposes to be described, the high potential end of primary winding 24 is coupled to the midpoint of secondary winding 27 by means of a network 30 comprising capacitors 31 and 32, inductance 33 and resistor 34. These elements will be additionally described later in the specification.

As indicated above, discriminator 17 includes a pair of diodes 20 and 21. Associated with diode 20 is an RC network 35 comprising load resistor 36 and shunt capacitor 37; and associated with diode 21 is RC network 38 comprising load resistor 39 and shunt capacitor 40.

In a conventional Seeley discriminator, and also in the improved discriminator illustrated in Figure 1, a quadrature relationship exists, at center frequency, between the voltage appearing across primary winding 24 and the voltage developed across secondary winding 27. The resultant voltages applied to the anodes of the upper and lower diodes 20 and 21 are equal, at center frequency, and the detected output voltages, developed across networks 35 and 38, are, therefore, of equal magnitude and opposite polarity. Hence, at center frequency the combined detected voltage, appearing between point $p$ and ground, is zero.

Above and below center frequency, the phase relationship between the primary and the secondary voltages with respect to each diode, shifts either toward an in-phase or an out-of-phase condition. The detected output voltages developed across networks 35 and 38 are then not equal, the difference therebetween appearing between point $p$ and ground as the output of the discriminator. The action of the discriminator, in this respect, is well known and need not be described in greater detail.

If the signal wave applied to discriminator 17 contains amplitude variations, as well as frequency modulations, the detected output voltages developed across networks 35 and 38 will change together, in a manner corresponding to the amplitude variations; and the changes, i. e., the increments or decrements, in the detected output voltages developed across networks 35 and 38, will tend to cancel each other. Complete cancellation, however, does not occur except at center frequency, the reason being that the percentage change in the detected output of each of the two diodes is equal, being substantially the same as the percentage amplitude-modulation of the signal. Consequently, at frequencies above and below center frequency, where the detected outputs of the two diodes are unequal, the absolute magnitude of the change in the smaller detected output signal is less than the absolute magnitude of the change in the larger detected output signal, and a net change occurs at point $p$ which corresponds to the difference between the change in the smaller output and the change in the larger output. In brief, at frequencies above and below center frequency, complete cancellation does not occur, and the audio output of the discriminator consequently contains components derived from amplitude variations in the signal wave applied to the discriminator.

The assigned pass band of the discriminator ordinarily occupies but a part of the linear portion of the output voltage-versus-frequency characteristic of the discriminator. In the passband region, the degree of cancellation with respect to the changes in the detected output voltage of the two diodes in response to amplitude variations, is substantial and not unsatisfactory. However, for frequencies outside the linear portion of the pass band, the degree of cancellation is usually smaller, and for frequencies, such as harmonics, which are quite widely removed from the center frequency, there is virtually no cancellation whatsoever. The output of the discriminator at these remote frequencies is admittedly relatively small, but not so small as to be negligible so far as the effect upon the noise-rejection characteristic of the receiver is concerned.

In prior art FM receivers, the frequency-modulated output of the limiter, which is applied to the discriminator, contains harmonics of appreciable magnitude. These harmonics, including the objectionable second, are generated in the limiter stages in the clipping process. It will therefore be seen that if, as a result of noise or other transient conditions, the amplitude of the frequency-modulated I.-F. carrier wave is cause to vary, the second and other harmonic components, contained in the output of the final limiter stage, will vary in amplitude in a manner corresponding to that in which the fundamental, i. e. the I.-F. carrier, varies. These amplitude-modulated hormonics are, in prior art FM receivers, applied, along with the fundamental, to the primary circuit of the discriminator. Voltage variations at harmonic frequency are hence developed across the primary tuned circuit which, in wide-band discriminators, and with respect to the second harmonic, may be five per cent or more of the voltage variations occurring at fundamental frequency. The detected output voltage of discriminator 17 will then contain a substantial component derived from the amplitude variations of the second harmonic. Since the second harmonic wave is so far removed, in frequency, from the center, or normal operating, frequency of the discriminator, substantially no cancellation occurs in the discriminator, which, under these circumstances, functions very much like an efficient amplitude-modulation detector. In fact, it can readily be shown that under these conditions, the detector, so far as second-harmonic operation is concerned, operates as a single-diode detector, the output of one of the diodes being negligible compared with that of the other.

It will be seen from the foregoing that the amount of noise in the output of the audio system is a function of the response of the discriminator at the second or $n$th harmonic. In wide-band FM receivers, which for the purpose of this specification may be defined as receivers employing a discriminator whose bandwidth expressed in cycles per second is 5 per cent or more of the center frequency, the response of the discriminator at the second harmonic is sufficient to cause noticeable and objectionable noise in the audio output.

Having discovered this important source of noise in wide-band FM receivers, I provide means for eliminating the second, and/or other objectionable, harmonics from the signal wave applied to the diodes of the discriminator.

In the circuit of Figure 1, the means for eliminating the objectionable harmonic comprises a parallel-resonant circuit 30 connected in series between the high potential end of the tuned primary circuit 22 and the mid-point of secondary coil 27. Parallel-resonant circuit 30 comprises capacitor 31, inductance 33 and resistor 34 and is tuned to the second, or other objectionable, harmonic of the center frequency of the I.-F. pass band. Resistor 34 is preferable, but not essential, its function, where employed, being to lower the Q-factor of circuit 30 sufficiently to provide relatively flat rejection over a band of frequencies corresponding to the objectionable second or $n$th harmonic of the frequency components comprising the frequency-modulated I.-F. carrier wave. In general, the second or $n$th harmonic will, of course, occupy two or $n$ times the bandwidth of the fundamental signal wave. Capacitor 32 is merely a small blocking capacitor intended to isolate the discriminator diodes from B+.

It will be seen that the parallel-resonant circuit 30 is effective to remove harmonic voltages from the signal wave applied, by way of the midpoint of secondary winding 27, to the anodes of diodes 20 and 21. This is sufficient to accomplish the purposes of the present invention, for it will be understood that voltages, including harmonic components, induced in secondary winding 27 by way of the mutual coupling M and applied in push-pull to the anodes of diodes 20, 21, are equal at all times, and, in the absence of dephased harmonic components at the center-tap of winding 27, no detection of the harmonic voltages can occur.

Figure 2 shows a circuit which is similar in most respects to the circuit of Figure 1, like components being designated by like reference numerals. However, in the circuit of Figure 2, the means for eliminating the objectionable second or $n$th harmonic comprises a series-resonant circuit 41 connected across the tuned primary circuit 22 and tuned to the second, or other undesired, harmonic of the I.-F. signal. Series-resonant circuit 41 comprises capacitor 42, inductance 43, and, if desired, damping resistor 44. It will be understood that, by means of damping resistor 44, the series-resonant circuit 41 may be given a sufficiently wide response to be effective to by-pass to ground the objectionable harmonic of the intermediate frequencies.

Ordinarily, it will be sufficient to eliminate the second harmonic only, either by means of the parallel-resonant circuit as shown in Figure 1, or by means of the series-resonant circuit as shown in Figure 2. However, if it is desired to eliminate more than one harmonic, as, for example, the second and third harmonics, both the parallel-resonant circuit 30 and the series-resonant circuit 41 may be employed. The parallel-resonant circuit may be tuned, for example, to the second harmonic, and the series-resonant circuit may be tuned to the third harmonic.

I have found the elimination of the second harmonic to provide an appreciable improvement in the noise-rejection characteristic of the discriminator, particularly where the bandwidth of the discriminator, in cycles per second, is five per cent or more of the I.-F. center frequency.

By way of example, I built a discriminator, substantially in accordance with the circuit shown in Figure 1, having the parallel-resonant circuit 30 tuned to the second harmonic, and having the following pertinent circuit constants and operating frequencies:

| | | |
|---|---|---|
| Capacitor 31 | $\mu\mu$f | 70 |
| Capacitor 32 | $\mu\mu$f | 150 |
| Inductance 33 | $\mu$h | 1.3 |
| Resistor 34 | ohms | 3300 |
| Limiter tube 19 | | 6AG5 |
| Diodes 20 and 21 | | 6AL5 |
| Center frequency of I.-F. pass band | megacycles | 10 |
| Pass band of I.-F. | do | 1 |

The improvement realized in the noise-rejection characteristic of the above discriminator, as indicated by the FM-AM ratio, was of the order twelve decibels, i. e., an improvement of the order of four to one.

While I have shown and described only a single known form of discriminator, i. e., the Seeley discriminator, it will be understood that my invention is not limited thereto and that other forms may be employed, as, for example, a stagger discriminator having detunded input circuits, commonly referred to as the Conrad or Round discriminator. With the stagger discriminator, the series-resonant by-pass illustrated in Figure 2 is preferably employed.

Having described my invention, I claim:

1. In a frequency-modulation receiver; a source of frequency-modulated carrier wave; a limiter circuit; means for applying said carrier wave to said limiter circuit; a frequency-discriminator circuit having an input network and an output network; means for applying the output of said limiter circuit to the input network of said frequency-discriminator circuit; and means connected in said input network for attenuating substantially the $n$th harmonic of said wave, where $n$ is a small integer other than one.

2. In a frequency-modulation receiver; a source of frequency-modulated carrier wave; a limiter circuit; means for applying said carrier wave to said limiter circuit; a frequency-discriminator circuit having an input network and an output network; means for applying the output of said limiter circuit to the input network of said frequency-discriminator circuit; and a tuned circuit in said input network for attenuating substantially the $n$th harmonic of said wave, where $n$ is a small integer other than one.

3. In a frequency-modulation receiver; a source of frequency-modulated carrier wave; an amplitude limiting circuit; means for applying said carrier wave to said circuit; a balanced frequency-discriminator tuned to said carrier wave; and means for applying the carrier wave from said amplitude-limiting circuit to said frequency discriminator; the improvement which comprises the provision in said discriminator of a resonant trap-circuit tuned to the $n$th harmonic of said carrier wave for preventing the deleterious effects of said $n$th harmonic on said discriminator, where $n$ is a small integer other than one.

4. In a frequency-modulation receiver; a source of frequency-modulated carrier wave; an amplitude limiter and means for applying said wave to the input circuit thereof, said amplitude limiter acting to generate an undesirable harmonic of said wave; a balanced frequency discriminator comprising a resonant input network tuned to said carrier wave and a pair of rectifier elements; and means for applying the output voltage of said amplitude limiter to the input network of said discriminator; the improvement which comprises the provision, in said input network of said discriminator, of a resonant wave trap tuned to said harmonic for reducing the deleterious effects of said harmonic.

5. In a frequency-modulation receiver; a source of frequency-modulated carrier wave; a limiter circuit; means for applying said carrier wave to said limiter circuit; a frequency-discriminator circuit having an input network and an output network; means for applying the output of said limiter circuit to the input network of said frequency-discriminator circuit; and means in said input network for attenuating substantially the second harmonic of said wave, said attenuating means including a circuit tuned to the second harmonic of the center frequency of said wave.

6. In a frequency-modulation receiver; a source of frequency-modulated carrier wave; a limiter circuit; means for applying said carrier wave to said limiter circuit; a frequency-discriminator circuit having an input network and an output network; means for applying the output of said limiter circuit to the input network of said frequency-discriminator circuit; and means in said input network for attenuating substantially the second harmonic of said wave, said attenuating means including a series-connected parallel-resonant circuit tuned to the second harmonic of the center frequency of said wave.

7. In a frequency-modulation receiver; a source of frequency-modulated carrier wave; a limiter circuit; means for applying said carrier wave to said limiter circuit; a frequency-discriminator circuit having an input network and an output network; means for applying the output of said limiter circuit to the input network of said frequency-discriminator circuit; and means in said input network for attenuating substantially the second harmonic of said carrier wave, said attenuating means including a series-connected parallel-resonant circuit tuned to the second harmonic of the center frequency of said wave, the Q factor of said parallel-resonant circuit being sufficiently low to provide a relatively flat response to the second harmonic of substantially all of the frequency components of said wave.

8. In a frequency-modulation receiver; a source of frequency-modulated intermediate-frequency carrier wave; a limiter circuit; means for applying said carrier wave to said limiter circuit; a frequency-discriminator circuit having an input network and an output network; means for applying the output of said limiter circuit to the input network of said frequency-discriminator circuit; and a series-resonant circuit connected across the output of said limiter circuit, said series-resonant circuit being tuned to the second harmonic of the center frequency of said carrier wave.

9. In a frequency-modulation receiver; a source of frequency-modulated intermediate-frequency carrier wave; a limiter circuit; means for applying said carrier wave to said limiter circuit; a frequency discriminator; means for applying the output of said limiter circuit to said frequency discriminator; and a series-resonant circuit connected across the output of said limiter circuit, said series-resonant circuit being tuned to the second harmonic of the center frequency of said carrier wave, the Q factor of said series-resonant circuit being sufficiently low to provide a relatively flat response to the second harmonic of substantially all of the frequency components of said wave.

JOSEPH C. TELLIER.

REFERENCES CITED

The following references are of record in the file of this patent:

UNITED STATES PATENTS

| Number | Name | Date |
|---|---|---|
| 1,738,274 | Anderson | Dec. 3, 1929 |
| 1,968,259 | Posthumus et al. | July 31, 1934 |
| 2,273,110 | Kimball | Feb. 17, 1942 |

Certificate of Correction

Patent No. 2,520,480 August 29, 1950

JOSEPH C. TELLIER

It is hereby certified that error appears in the printed specification of the above numbered patent requiring correction as follows:

Column 2, lines 11 and 12, for the word "compounds" read *components*; column 6, line 18, for "do" read *megacycle*; line 30, for "detunded" read *detuned*;

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*